Sept. 10, 1968          N. L. KELLER ET AL          3,400,787
DUO-SERVO PARKING BRAKE COMBINED WITH NON-SERVO SERVICE BRAKE
Filed Dec. 15, 1965
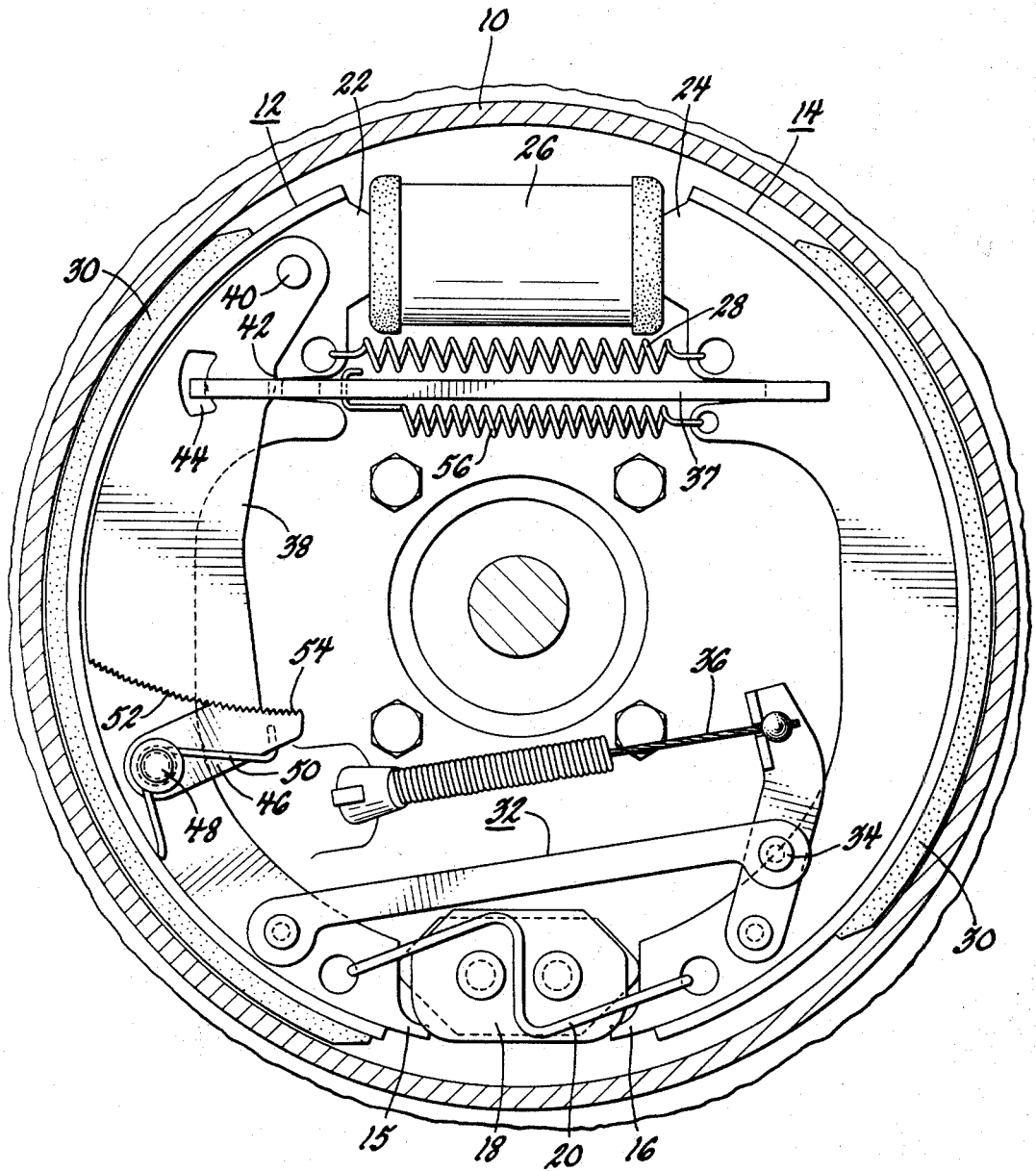
INVENTORS
Norbert L. Keller
Jack T. Cornillaud
BY
Donald P. Selwerski
THEIR ATTORNEY

3,400,787
DUO-SERVO PARKING BRAKE COMBINED WITH NON-SERVO SERVICE BRAKE
Norbert L. Keller and Jack T. Cornillaud, Dearborn, Mich., assignors to General Motors Corporation, Detroit, Mich., a corporation of Delaware
Filed Dec. 15, 1965, Ser. No. 514,010
8 Claims. (Cl. 188—106)

ABSTRACT OF THE DISCLOSURE

In the preferred form, the present invention relates to the braking mechanism which has a non-servo conventional braking capability with a duo-servo parking brake capability. In addition, a link between the two brake shoes providing the duo-servo parking brake capability also functions as an element in the automatic adjusting mechanism establishing a base from which the brake shoes are adjusted relative to the drum during brake lining wear.

---

The parking brake mechanism used as a part of a non-servo service brake usually includes a cable driven member through which one of the brake shoes is actuated. When a vehicle is parked on a grade, or when the parking brake is utilized as an emergency brake, the vehicle has a tendency to move and therefore the brake drum tends to rotate. The brake mechanism herein disclosed and claimed utilizes the mechanical servo action of the brake drum generated by the drum's tendency to rotate to more firmly set the parking brake of a non-servo service brake. The brake mechanism also has an automatic adjuster provided as a part of the drive link means imparting a mechanical servo braking action to one brake shoe when the other brake shoe is moved away from the shoe anchor pin in the direction of braked rum rotation during brake actuation.

It is an object of the present invention to provide an improved parking brake mechanism which utilizes a vehicle wheel's rotational tendency to intensify a braking force applied to a vehicle brake drum.

It is another object of the present invention to provide an improved parking brake mechanism which normally acts to apply a braking force to a brake drum by simultaneously driving a pair of opposed brake shoes into frictional engagement with the rotatable drum.

It is still another object of the present invention to carry out the aforementioned objects utilizing simple mechanisms which are economical to manufacture.

Further objects and advantages of the present invention will be apparent from the following description reference being had to the accompanying drawings wherein preferred embodiments of the present invention are clearly shown.

In the drawing:

The subject invention is illustrated in elevation.

Referring to the drawing, rotatable drum 10 is carried by the vehicle wheel and opposed brake shoes 12 and 14 are carried in juxtaposition to drum 10 by a relatively fixed portion of the vehicle. First ends 15 and 16 of brake shoes 12 and 14 respectively are maintained in biased engagement with an anchor block 18 by a resilient member 20. Second opposed ends 22 and 24 of shoes 12 and 14 respectively are operatively engaged by a hydraulic wheel cylinder 26 which serves to separate brake shoes 12 and 14 against the bias of spring 28 to drive linings 30 into frictional engagement with drum 10.

Toggle mechanism 32, sometimes referred to herein as first actuating means, pivotally engages brake shoes 12 and 14 near first ends 15 and 16 and is driven around pivot point 34 by a cable 36 attached to a hand brake lever in any well-known fashion. Toggle mechanism 32 is normally in the over center position and, when driven toward a centered position by a force exerted on cable 36, results in an outward movement of shoes 12 and 14 away from anchor block 18.

Servo rod 37 engages brake shoe 14 and pivotable ratchet member 38. Ratchet member 38 is pivotally carried by shoe 12 at point 40. Servo rod 37 drivably engages ratchet member 38 at point 42 and in slot 44. Pawl member 46 is pivotally supported on brake shoe 12 on point 48 and is biased by torsion spring 50 toward ratchet member 38. Opposed tooth portions 52 and 54 formed on opposed ends of members 38 and 46 respectively tend to inhibit relative sliding movement between these members. Servo rod 37 is biased toward shoe 14 by spring 56 so that rod 37 and the adjusting means 38 and 46 collectively are referred to herein as drive link means.

In operation, a parking brake actuating cycle is initiated by a pulling force exerted on cable 36. The force exerted on cable 36 tends to pivot toggle mechanism 32 around point 34 resulting in a spreading of brake shoes 12 and 14 apart. When this occurs, first ends 15 and 16 of brake shoes 12 and 14 respectively leave anchor block 18 and come into engagement with drum 10. If the vehicle is in motion when the actuation takes place, or if there is a rotational tendency of the vehicle due to being parked on an incline, both of the brake shoes 12 or 14 will be driven in the direction of the rotational tendency of drum 10. It is assumed in this explanation that drum 10 tends to rotate counterclockwise as viewed in the drawing.

Shoe 12 moves against anchor block 18 and, as shoe 14 moves in a counterclockwise direction, a force is generated and transmitted through servo rod 37 to ratchet member 38. Ratchet member 38 is carried by shoe 12 and engages pawl member 46. This prevents clockwise rotation of pawl member 38 around point 40 resulting in a direct force transmission between servo rod 37 and shoe 12. Shoe 12 pivots on anchor block 18 toward drum 10 with a force exerted by toggle mechanism 32 intensified by the force transmitted from shoe 14 through servo rod 37. Therefore, utilizing the present invention, both brake shoes are utilized to provide a parking brake mechanism regardless of the direction of rotational tendency of the brake drum with one of the brake shoes being directly urged into frictional engagement with a brake drum and the opposed shoe being driven into the brake drum by an actuating force intensified by a servo action.

It should be noted that ratchet member 38 is rotationally movable relative to pawl member 46 when rotated in a counterclockwise direction about point 40 but is not capable of movement relative to pawl member 46 when rotated in a clockwise direction around point 40. The position of toothed portions 52 and 54 is established by the repositioning of the brake shoes after a brake actuation brought about by servo rod 37 maintaining a fixed distance relationship between point 42 and shoe 14. Therefore if during a previous brake actuation more movement was required than is allowed by the width of slot 44, the toothed portion 52 of ratchet member 38 moves relative to tooth portion 54 of pawl member 46 establishing a new fixed point from which future brake actuations take place. This results in the control of the relationship of point 42 and shoe 14 thereby maintaining brake shoes 12 and 14 in adjusted centered disposition relative to wheel cylinder 26 and anchor block 18.

While the embodiment of the present invention as herein disclosed constitutes a preferred form, it is to be understood that other forms might be adopted.

What is claimed is as follows:

1. Braking mechanism for motor vehicle wheels in combination said braking mechanism comprising, brake shoes carried a predetermined distance away from a rotatable drum by a relatively fixed portion of a vehicle; energizing means carried by a fixed portion of the vehicle for driving said brake shoes into frictional engagement with the rotatable drum to bring about a braking action, first actuating means carried by said brake shoes and mechanically actuatable to drive said brake shoes into frictional engagement with a rotating drum; and drive link means operatively carried between opposed ends of said brake shoes to impart a servo braking action to one of the opposed brake shoes when the oppositely disposed brake shoe moves away from the anchor pin in the direction of drum rotation during brake actuation, said drive link means including automatic take-up means for maintaining said brake shoes a predetermined distance from said drum.

2. The braking mechanism combination according to claim 1 wherein said first actuating means is a toggle lever actuator engaging opposed ends of said brake shoes and being mechanically driven by a cable connected thereto.

3. The braking mechanism according to claim 1 wherein said drive link means includes a brake adjusting means having a reaction member engaging a portion of said adjusting means and an oppositely positioned brake shoe.

4. The braking mechanism combination according to claim 3 wherein said adjusting means includes a pivotable ratchet member and a biased pivotal pawl member cooperating to maintain said brake shoes a predetermined distance away from the rotatable drum when the brakes are in a poised position.

5. A parking brake mechanism for the wheels of a motor vehicle equipped with servo brakes, said parking brake mechanism comprising in combination: a rotatable drum carried by a vehicle wheel; a plurality of brake shoes in opposed disposition and carried by a relatively fixed portion of the vehicle in juxtaposition to the rotatable drum; anchor means fixedly positioning a first pair of opposed ends of said brake shoes; brake energizing means carried by a fixed portion of the vehicle and drivably engaging second opposed ends of said brake shoes; a manual actuating means engaging said first ends of said brake shoes for driving said first ends of said brake shoes apart into frictional engagement with the rotatable drum; and drive link means engaging said second ends of said brake shoes to impart a force from one brake shoe to the other brake shoe generated by a rotational tendency imparted to a given brake shoe as that brake shoe contacts the rotatable drum during mechanical brake actuation, said drive link means including a pivotable lever having a geared portion cooperating with a geared portion on a brake shoe to directly transmit force to said brake shoe when pivoted relative thereto in the direction of said drum, said brake shoe carried geared portion movable relative to said lever carried gear portion when pivoted in the direction of said drum to establish a new relationship therebetween during powered braking operation.

6. The parking brake mechanism combination according to claim 5 wherein said drive link means includes a pawl and ratchet type brake adjuster engaging one end of a servo rod which imparts a force generated during a braking action to a first brake shoe and to an opposed second brake shoe to intensify the braking force generated by the second brake shoe.

7. The park braking mechanism combination according to claim 5 wherein said adjusting mechanism of the drive link means establishes a new base point for movement of the brake shoes as acted on by the servo rod during brake actuations after wear has occurred on linings carried by the brake shoes.

8. The parking brake mechanism combination according to claim 6 wherein said adjusting means includes a rotatable ratchet member drivably engaging a brake shoe through a spring loaded rotatable pawl member to move the brake shoe into frictional engagement with the rotatable drum, said rotatable ratchet member being repositioned by said servo rod during brake retraction to establish a new base point from which subsequent brake applications occur.

References Cited

UNITED STATES PATENTS

| | | | |
|---|---|---|---|
| 2,144,025 | 1/1939 | La Brie | 188—106 |
| 2,258,893 | 10/1941 | Humphrey | 188—106 |
| 2,322,061 | 6/1943 | Schnell | 188—106 |
| 3,339,678 | 9/1967 | Burnett | 188—196 X |

DUANE A. REGER, *Primary Examiner.*